United States Patent [19]
Ishii et al.

[11] Patent Number: 5,187,696
[45] Date of Patent: Feb. 16, 1993

[54] METHOD FOR SETTING THE LOOP GAIN IN A FOCUSING SERVO LOOP

[75] Inventors: Hidehiro Ishii; Hiroshi Takeya; Chiharu Miura; Tatsuya Fukuda, all of Saitama, Japan

[73] Assignee: Pioneer Electronic Corporation, Tokyo, Japan

[21] Appl. No.: 398,875

[22] Filed: Aug. 28, 1989

[30] Foreign Application Priority Data
Mar. 18, 1989 [JP] Japan .................................. 1-67329

[51] Int. Cl.$^5$ .............................................. G11B 7/09
[52] U.S. Cl. .................... 369/44.29; 369/44.34; 369/44.35; 369/58
[58] Field of Search ............... 369/44.29, 44.35, 44.11, 369/44.36, 44.28, 47, 48, 44.29, 44.11, 44.25, 44.26, 44.32, 44.35, 44.36, 44.41, 58, 32, 44.34

[56] References Cited
U.S. PATENT DOCUMENTS
5,010,538 4/1991 Takeda et al. ............... 369/44.29

FOREIGN PATENT DOCUMENTS
0247829 12/1987 European Pat. Off. .

Primary Examiner—Aristotelis Psitos
Assistant Examiner—Muhammad Edun
Attorney, Agent, or Firm—Sughrue, Mion, Zinn Macpeak & Seas

[57] ABSTRACT

A method for setting the loop gain in a focusing servo loop of a disc player. The loop is opened and the objective lens is moved repeatedly up and down about the focusing point while the disc is slowly rotated, thereby generating an S-shaped focusing error curve. The S-shaped error curve is sampled and a loop gain is determined based on the sampled values. If an eject instruction occurs during the loop gain setting process, a braking pulse is applied to a spindle motor for stopping the disc rotation.

11 Claims, 4 Drawing Sheets

METHOD FOR SETTING THE LOOP GAIN IN A FOCUSING SERVO LOOP

BACKGROUND OF THE INVENTION

The present invention relates to methods for setting the loop gain in a servo loop of a focusing servo device.

In an optical disc player for playing an information storage disc (referred to as disc, hereinafter) such as a video disc, a digital audio disc and the like, it is essential to provide a focusing servo device for focusing a light beam on the recording surface of the disc to form an information reading light spot. One type of focusing servo device uses the so-called astigmatism method, in which a focal error signal is generated on the basis of four signals from a four-piece detector. The detector is placed at the mid-point between the two points which are apart from each other in the light path of the beam and on each of which beams are converged by cylindrical lenses to form lines, for example, one in a horizontal direction and the other in a vertical direction.

However, in the focusing servo device, it is sometimes the case that a fluctuation in the laser light source power or a variation in the reflectivity of the disc causes the loop gain in the servo loop system to change with each playing of a disc. The fluctuation in the loop gain leads to a decline in tracking performance with respect to focusing errors, thereby preventing stabilized servo operation.

SUMMARY OF THE INVENTION

It is an object of the invention to provide methods for setting the loop gain in a focusing servo loop, with which the optimum loop gain can be automatically set when a disc is to played.

A method according to the present invention is characterized in that the gain is set based on a plurality of sample values representing the amplitudes of a focusing error signal which is obtained by repeating a plurality of vertical movements of an objective lens about the focusing position of the lens during revolution of a disc.

Another method according to the present invention is characterized in that when an eject instruction is issued during the loop gain setting process, a spindle motor is stopped by having impressed thereon reverse-rotation driving pulses with a width or a peak depending on the time elapsed from the extinction of forward-rotation driving pulses until the occurrence of the eject instruction and the pulse width of the forward-rotation driving pulse.

DETAILED DESCRIPTION OF THE EMBODIMENTS

Referring to the accompanying drawings, the preferred embodiments according to the present invention will be described hereinafter.

Figure 1:
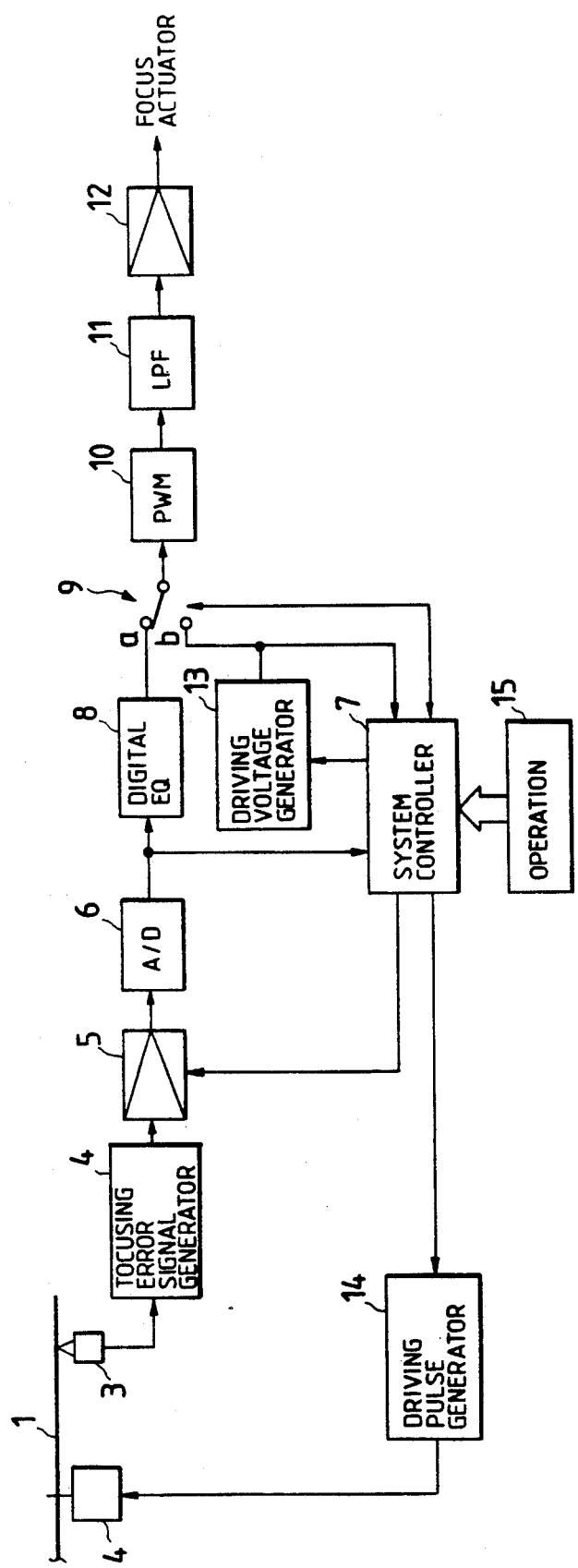
FIG. 1 is a block diagram showing an embodiment of a focusing servo device for carrying out the method according to the present invention for setting the loop gain.

FIG. 1 is a block diagram showing an embodiment of a focusing servo device to which the methods according to the present invention are applied. In FIG. 1, a spindle motor 2 drives and rotates a disc 1, whose stored information is read by a photo pick-up 3. The pick-up 3 is mounted on a carriage (not shown) so provided as to be fully movable along the axis of the disc. In a circuit 4, a focusing error signal is produced on the basis of a beam emitted from the pick-up 3 and reflected from the information storage surface of the disc 1, for the purpose of which an error generating method according to the well-known astigmatism method is used.

The focusing error signal generated by the focusing error signal generator circuit 4 is amplified by a voltage controlled amplifier (VCA) 5 and then digitized by an analog-digital (A-D) converter 6. A part of the digitized signal is supplied to a system controller 7 and the other part of the signal has its frequency-phase characteristics compensated by a digital equalizer (EQ) 8, to become an input to a loop switch 9. The signal from the loop switch 9 is supplied to a pulse-width modulator (PWM) circuit 10, where it is converted into a driving signal with a pulse width dependent on the level of the error signal. After passing through a low pass filter (LPF) 11 and a driving amplifier 12, the driving signal is supplied to a focus actuator (not shown) which varies the position of an objective lens along the optical axis.

Thus, a focusing servo loop is formed. When the switch 9 is connected to the output of the digital equalizer 8 at terminal "a", the focusing servo loop is closed and the focus actuator is driven based on the focusing error signal, thereby focusing the information reading light beam precisely on the information storage surface of the disc.

Figure 2:
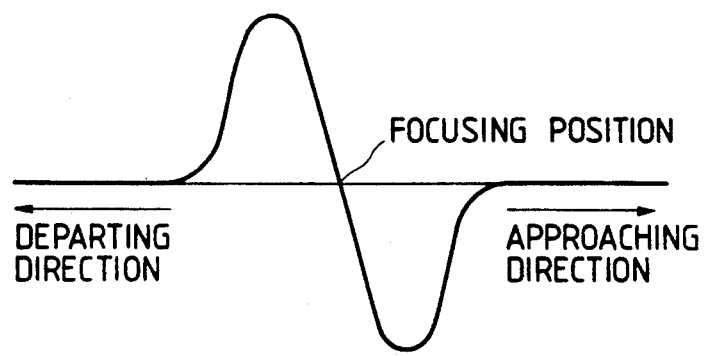
FIG. 2 is a waveform chart showing a variation in a focusing error signal with respect to the distance between the objective lens and the disc surface.

A driving voltage generator circuit 13 generates a digital driving voltage, which is the other input to the loop switch 9, whereby the objective lens can be moved up and down along the optical path in response to the instructions from the system controller 7 when a focusing servo is led in; i.e., during the period when the loop gain is set by the procedure according to the present invention. When the loop switch 9 is connected to terminal "b", the servo loop is open. A driving voltage is supplied to the focus actuator via PWM circuit 10, LPF 11 and driving amplifier 12. The objective lens is driven in an up-and-down movement about its focusing position as a result of a ramp shaped driving voltage from a generator 13, under control of the controller 7. This leads to a focusing error signal at the output terminal of the VCA 5. The error signal will have a so-called S-shaped characteristic, as shown in FIG. 2, with zero crossings occurring when the objective lens is at a proper focusing position.

In response to the instruction from the system controller 7, a driving pulse generating circuit 14 generates a forward-rotation driving pulse having a pulse width dependent on the operation mode for driving the spindle motor 2. The circuit 14 also generates a reverse-rotation driving pulse with a predetermined pulse width to provide the spindle motor 2 with a braking force in response to an instruction sent from the system controller 7 if an eject instruction is issued while the focusing servo is led in.

The system controller or processor 7 comprises, for example, a microcomputer. The controller operates with the help of the computer to control and drive a disc loading and clamping mechanism (not shown) and a carriage support for pick-up 3. When the focusing servo is led in, the controller further performs the process for setting the loop gain, as will be described below.

Figure 3:
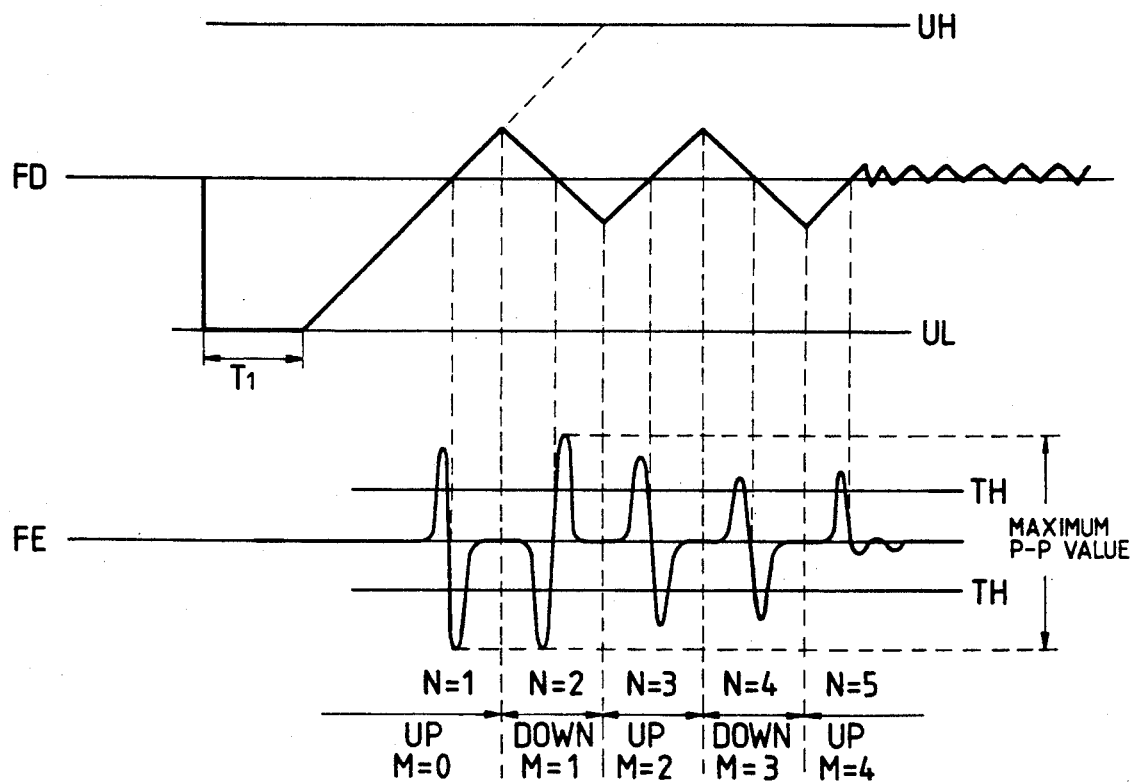
FIG. 3 is a timing chart showing the operation of a focusing servo loop.
Figure 4:
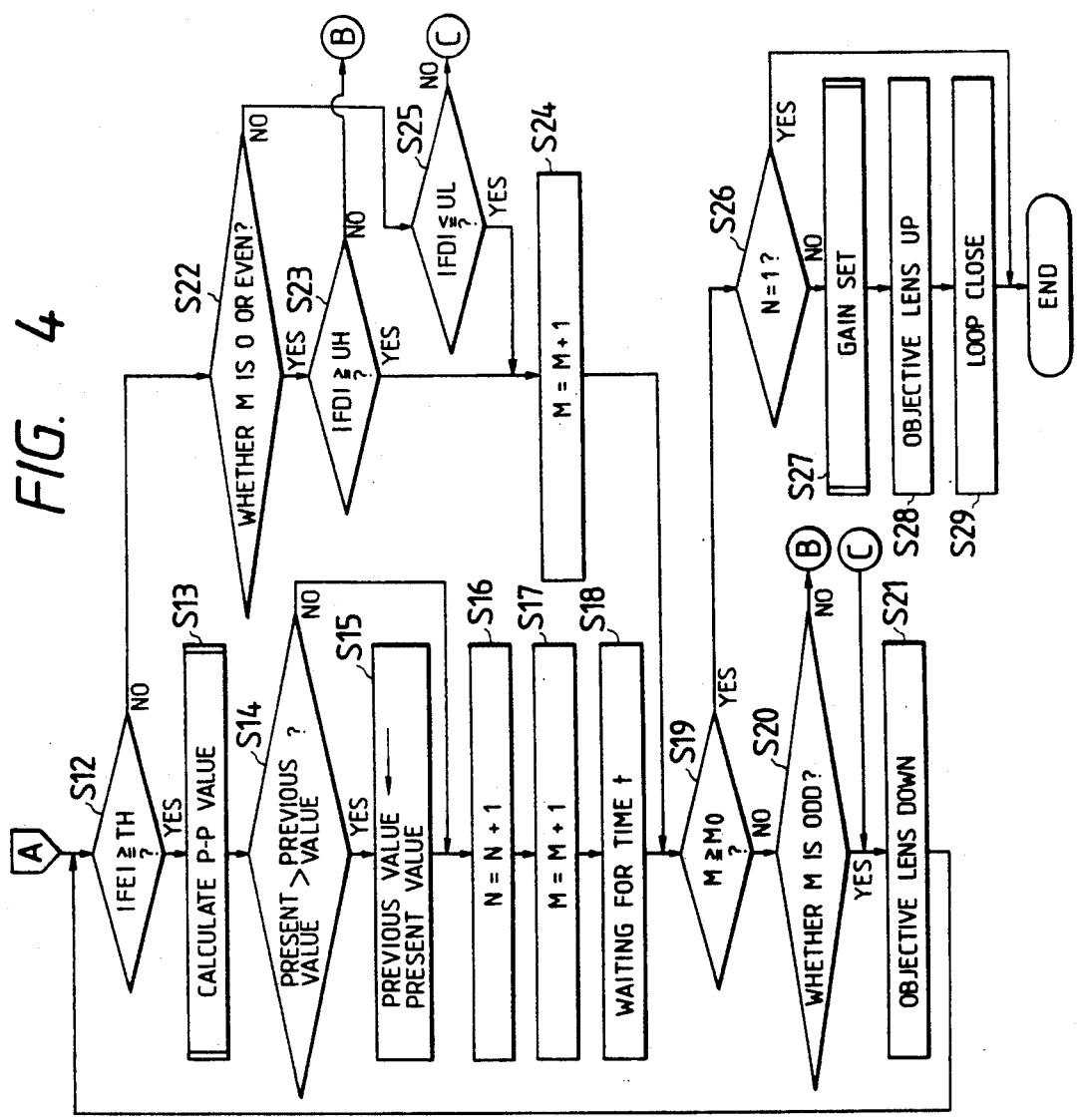
FIG. 4 is a flow chart showing the methods according to the present invention.

The procedure for setting the loop gain according to the present invention will be described with reference to the timing chart shown in FIG. 3 and the flow chart shown in FIG. 4. Hereinafter, it is assumed that the process of leading-in of the focusing servo will not start until after completion of loading and clamping of the disk, and it has been detected that the carriage support has reached the inner-most track. It is also assumed that when the above condition occurs, the loop switch 9 is toggled to terminal "b", causing the servo loop to be open.

Detecting the arrival of the carriage at the innermost track by means of the output from a not-shown detecting means, the processor, at step (S1), initializes and resets stored data in the internal memory of a RAM and values in various kinds of counters, turns on a laser light source of the pick-up 3 at step (S2), and then controls the driving pulse generating circuit 14 at step (S3) to generate a kick pulse, that is, a forward-rotation driving pulse with an amplitude H. At step (S4) the processor controls the circuit 14 at step (S5) to make it stop generating the forward-rotation driving pulse a predetermined time W1 (e.g., 100 ms) after the start of the driving pulse. The pulse width W1 and height H of the forward-rotation driving pulse determines the number of rotations of the spindle motor 2. The pulse width W1 and height H are so set that the spindle motor 2 rotates for a much shorter period and at a far lower revolving speed than it does during normal play. As an example, the spindle motor may rotate at a rate of 10 rpm in response to the forward driving pulse from circuit 14. At this speed, scars, stains and pits will not have any effect.

Subsequently, at step (S6), the processor controls a driving voltage generating circuit 13 to make it generate a negative driving voltage FD to move the objective lens downward; at step (S7) the objective lens continues to be driven downward until the absolute value |FD| of the driving voltage exceeds the least limit value UL of a focus driving voltage. When |FD|≧UL, a timer-counter begins a counting operation at step (S8). The counting operation is synchronized with an internal standard clock. At step (S9), the time count of the timer-counter is compared with a predetermined time T1 (e.g., 50 ms). When a time T1 has passed, the processor, at step (S10), increments the value N of an internal counter and, in step (S11), controls the driving voltage generating circuit 13 to make it generate a gradually-increasing ramp-shaped driving voltage FD to move the objective lens upward. Here, the counted value N indicates the number of readings of positive and negative values in the S-shaped curve.

Subsequently, in step (S12), it is determined whether the error data FE, obtained at the output of A/D converter 6 has an absolute value |FE| which exceeds a threshold level TH. If |FE|≧TH, it is determined that the output data is not noise, but is a true focusing error. As previously noted, the focusing error signal will have an S-shaped characteristic in the neighborhood of the focusing position of the objective lens. At steps (S13) and (S14), the difference between the positive and negative wave heights of the error data, that is, the peak-to-peak value, is calculated from the error data. The peak-to-peak value is calculated, for example, in the following manner. The sampled error data appearing at the A/D output is compared with the previous sample. Successive samples, each being larger than the previous sample, indicates a positive slope. The first sample which is lower than the previous sample indicates that the previous sample is the peak positive value. The peak negative value is determined in a similar way and the peak-to-peak value is calculated.

At step (S15), the current and previous peak-to-peak values are compared. If the current value is larger than the previous value, the current value is stored in memory and becomes the new previous value. If not, the previous value is kept as it is. In this way, the memory retains the maximum peak-to-peak value which has been obtained. Subsequently, at steps (S16) and (S17), the counted values N and M of inner counters I and II are incremented. The counted value M indicates the number of up-and-down movements of the objective lens. After a predetermined time t (e.g., 5 ms) has passed, as determined at step (S18), it is determined at step (S19) whether the counted value M of the inner counter II is equal to a predetermined value MO (e.g., 4) or more; that is, whether up-and-down movements of the objective lens have been performed a number of time, at least equal to MO.

If M<MO, it is determined at step (S20) whether the value M is odd or not. If M is zero or even, the processor returns to step (S11) to reverse the lens driving direction and repeat the above-mentioned operations. If the value M is odd, the processor (S21) controls the driving voltage generating circuit 13 to make it generate a gradually-decreasing ramp-shaped driving voltage FD to reverse the lens driving direction and move the objective lens downward. The process returns to step (S12), and repeats the above-mentioned operations.

If the judgment in step (S12) is |FE|<TH, in step (S22) the counted value M of the inner counter II is judged to see if it is zero or even. If the value M is zero or even, at step (S23) the driving voltage FD is judged to see if it has become equal to or greater than its upper limit value UH. If FD≧UH, at step (S24) the counted value M of the inner counter II is incremented and then the procedure branches to step (S19). If FD<UH, the procedure returns to step (S11) to repeat the above-mentioned operations. On the other hand, if the value M is judged odd in step (S22), at step (S25) the driving voltage FD is judged to see if it has become equal to or less than its lower limit value UL. If |FD|<UL, the procedures branches to step (S24), if not it goes to step (S21).

If the judgment in step (S19) is M≧MO, the counted value N of the inner counter I is judged to see if it is one. If this condition exists, it means that no peak-to-peak values of the S-shaped error curve have been taken during the time the objective lens has been moved up and down. Under this condition, the above-mentioned steps are terminated without the loop gain being set. In this case, for example, the above-mentioned process is performed again. If N≠1, the processor controls the gain of VCA 5 at step (S27) to set the loop gain in the focusing servo loop on the basis of the maximum peak-to-peak value which has finally been stored into memory in step (S15). At step (S28), the driving voltage generating circuit 13 is controlled to make it generate a gradually-increasing ramp-shape driving voltage (FD) to move the objective lens upward, and then at step (S29), the controller toggles the switch 9 onto the terminal "a" to close the servo loop, whereby the series of steps to set the loop gain is completed.

That is, in order to set the loop gain in a focusing servo loop; first, a spindle motor 2 is driven to rotate; the up-and-down movements of the objective lens is repeated about the focusing position a plurality of times during the rotation of the motor 2, through which a focusing error signal is produced; a plurality of, for example, peak-to-peak values representing the magnitudes of the amplitudes of the focusing error signal, are taken in as sample values; and the loop gain is set on the basis of the maximum value of the taken-in sample values. This makes it possible to automatically set the optimum loop gain irrespective of fluctuation in the power of the light source or variation in the reflectivity of the discs. And even though there are scars and stains on the disc which will cause noise with a characteristic like S-curve, the level of the noise will be so small that it will not be accidentally detected as the S-curve of a true focusing error.

Moreover, whereas in the above-mentioned embodiment the spindle motor 2 is driven with a specific pulse width, a constant voltage can be impressed to keep the disc rotating at a constant revolving speed only for the period of automatic adjustment of the loop gain, and can be stopped after the automatic setting of the loop gain.

Furthermore, whereas in the above-mentioned embodiment the maximum value of a plurality of peak-to-peak values is used to determine the loop gain, the average value of a plurality of peak-to-peak values can also be used to determine a loop gain.

A method of determining the loop gain will be described in more detail. For example, it is assumed that the focusing servo devise shown in FIG. 1 is designed so that it is optimum when a peak-to-peak value of the focusing error signal is 1.8 volt. In the device, at first, the gain of the voltage controlled amplifier (VCA) 5 is set at, for example, 1. For a disc, when the maximum value of a plurality of peak-to-peak values is 2.0 volt, the gain of the VCA is set at 1.8/2.0 (0.9) so that the optimum loop gain is set. Also, when the average value of a plurality of peak-to-peak values is 1.5 volt, the gain of the VCA is set at 1.8/1.5 (1.2) so that the optimum loop gain is set. It is also possible to determine the loop gain by changing the direct current gain of the digital equalizer (EQ) 8 or the conversion gain of the PWM (D/A). Of course, it is also possible to determine the loop gain by the combination of the above methods.

Figure 5:
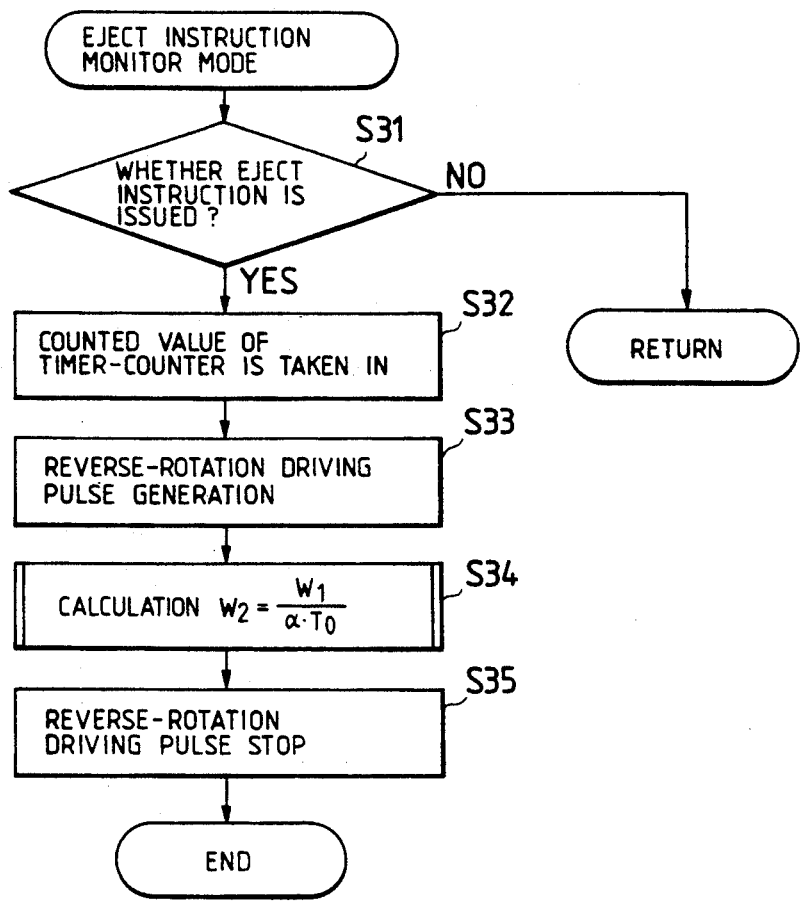
FIG. 5 is a flow chart showing the process of an eject instruction monitoring mode.
Figure 6:
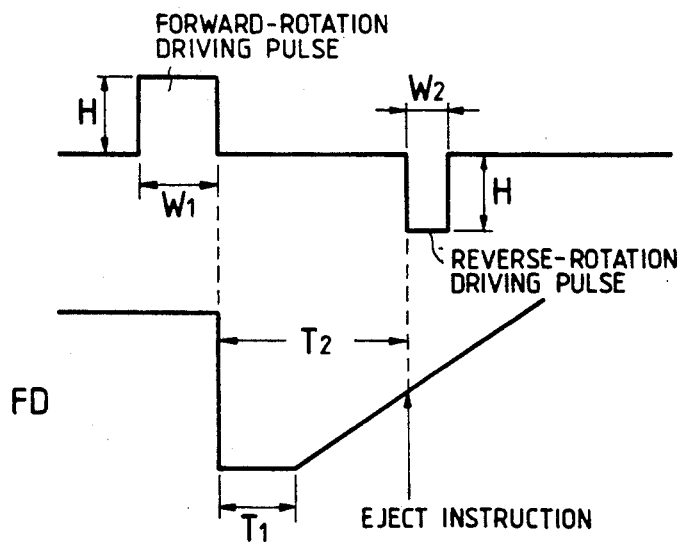
FIG. 6 is a timing chart for the eject instruction monitoring mode.

In the process of a lead-in operation of the focusing servo described above, if an eject instruction is issued from an operational part of the system, a process will be executed whereby the spindle motor 2 is supplied with braking to cause it to stop immediately. Referring to the timing chart in FIG. 6 and following the flow chart in FIG. 5, hereinafter will be described a processing procedure, whose subroutine is called up and executed in a predetermined period during the focusing servo lead-in operation.

The processor at step (S31) judges whether an eject instruction has been issued from the operation part 15. If an eject instruction has been issued, at step (S32) the counted value of the timer-counter started at step (S8), shown in FIG. 4, is taken in. Since the counted value D corresponds to the time T2 elapsed from the extinction of the forward-rotation driving pulse for the spindle motor 2, assuming the clock period for the timer-counter to be $\tau$, the time elapsed can be found through the operational equation $T2 = D \times \tau$. Then, in order to provide the spindle motor 2 with braking, at step (S33) the processor controls the driving pulse generating circuit 14 to cause it to generate a reverse-rotation driving pulse with a wave height of, for example, H, as a braking pulse. Subsequently, the processor calculates the pulse width W2 of a reverse-rotation driving pulse through the operational equation $W2 = W1/\alpha * T2$ ($\alpha$ is a constant) on the basis of the pulse width W1 of the forward-rotation driving pulse and the time T2 elapsed from the extinction of the forward-rotation driving pulse until the eject instruction is issued. At step (S34) the controller waits for the time corresponding to the pulse width W2 to elapse, and at step (S35) it controls the driving pulse generating circuit 14 to make it stop generating the reverse-rotation driving pulse.

That is to say, when an eject instruction is issued from the operation part 15 in the process of the focusing servo lead-in operation, a braking pulse is generated and applied to motor 2. A braking pulse is a reverse-rotation driving pulse having a pulse width W2 dependent upon the pulse width W1 of the forward-rotation driving pulse and the time T2 elapsed from the extinction of the forward rotation driving pulse until the eject instruction is issued. This makes it possible to begin the eject operation after the disk 1 has stopped completely. Thus, the disc 1 can be ejected without being scarred.

Moreover, in the above embodiment, the pulse width W2 of a reverse-rotation driving pulse is determined depending on the pulse width W1 of the forward-rotation driving pulse and the time T2 elapsed from the extinction of the forward-rotation driving pulse until the eject instruction is issued, whereas the same effect can be obtained from determining the pulse height H of a reverse-rotation driving pulse depending on the pulse width W1 of the forward-rotation driving pulse and the time T2 elapsed from the extinction of the forward-rotation driving pulse until the eject instruction is issued.

As described above, according to the loop gain setting methods based on the present invention, it is possible to set automatically an optimum loop gain irrespective of the fluctuation in the power of a laser light source and a variation in the reflectivity of the discs.

What is claimed:

1. In a disc player of the type having an objective lens for focusing a reading light on the surface of a disc and a focusing servo loop for adjusting the height of said lens for proper focusing, said loop having a gain controlled amplifier and a focus error signal generator; a method of setting the loop gain of said servo-loop while said servo loop is open, comprising:

rotating said disc in said disc player;
   moving said objective lens repeatedly in an up-down pattern through the focusing point a predetermined number of times to cause said error signal generator to generate an error signal having an S-shape in the vicinity of said focusing point;
   sampling the values of said S-shaped error signal during each up-down movement of the objective lens;
   determining, after each upward movement and after each downward movement, whether a sampled value of said S-shaped error signal exceeds a predetermined threshold, and setting the loop gain based exclusively upon a maximum sampled value of a plurality of said sampled values obtained from said S-shaped error signal, wherein said plurality of sampled values only includes sample values that exceed said predetermined threshold.

2. A method according to claim 1, wherein said sample values are differences between positive and negative wave heights, or peak-to-peak values of said S-shaped error signal.

3. The method as claimed in claim 1, wherein said moving step is repeated a predetermined number of times, such that a predetermined number of sample values are obtained for said loop gain setting step.

4. The method as claimed in claim 1, wherein said objective lens is repeatedly moved between a point above and a point below said focusing point during each up-down motion.

5. The method as claimed in claim 1, wherein each of said sample values represent amplitudes of said S-shaped error signal, and wherein samples are measured during multiple up-down passes of the objective lens through said focusing point.

6. In a disc player of the type having an objective lens for focusing a reading light on the surface of a disc and a focusing servo loop for adjusting the height of said lens for proper focusing, said loop having a gain controlled amplifier and a focus error signal generator; a method of setting the loop gain of said servo-loop while said servo loop is open, comprising:

rotating said disc in said disc player;

moving said objective lens repeatedly in an up-down pattern through the focusing point a predetermined number of times to cause said error signal generator to generate an error signal having an S-shape in the vicinity of said focusing point;

sampling the values of said S-shaped error signal during each up-down movement of the objective lens;

determining, after each upward movement and after each downward movement of the optical pickup, whether sampled value of said S-shaped error signal exceeds a predetermined threshold to differentiate between sample values that represent noise and sample values that represent a true focusing error signal; and setting the loop gain based only upon a plurality of said sampled values that exceed said predetermined threshold.

7. A method according to claim 6, wherein said loop gain is set on the basis of an average value of a plurality of said sample values.

8. The method as claimed in any of claims 7 and 2, wherein the step of rotating said disc comprises:

generating a forward driving pulse of a predetermined width, and applying said forward driving pulse to a spindle motor which rotates said disc in a direction and speed determined by said forward driving pulse, said speed being slower than a normal playing speed.

9. The method as claimed in claim 8, further comprising detecting the presence of an instruction to eject the disc from said player at a time during the setting of said loop gain;

in response to said detecting, generating a reverse rotation driving pulse having one of a pulse height and pulse width dependent upon the pulse width of said forward driving pulse and the elapsed time since the termination of said forward driving pulse, said pulse width $W_2$ equaling the following equation;

$$W_2 = \frac{W_1}{a \cdot T_2},$$

where $W_1$ equals the pulse width of the forward driving pulse, X equals a constant, and $T_2$ equals a time elapsed since the forward driving pulse was stopped; and applying said reverse rotation driving pulse as a braking pulse to said spindle motor.

10. In a disc player of the type having an objective lens for focusing a reading light on the surface of a disc and a focusing servo loop for adjusting the height of said lens for proper focusing, said loop having a gain controlled amplifier and a focus error signal generator; a method of setting the loop gain of said servo-loop while said servo loop is open, comprising the steps of:

rotating said disc in said disc player;

moving said objective lens repeatedly in an up-down pattern through the focusing point a predetermined number of times to cause said error signal generator to generate an error signal having an S-shape in the vicinity of said focusing point;

sampling the values of said S-shaped error signal during each up-down movement of the objective lens; and setting the loop gain based exclusively upon a maximum value of a plurality of said sampled values of said S-shaped error signal, wherein said disc is rotated at a speed slower than a disc playing speed while said loop gain setting method is performed.

11. In a disc player of the type having an objective lens for focusing a reading light on the surface of a disc and a focusing servo loop for adjusting the height of said lens for proper focusing, said loop having a gain controlled amplifier and a focus error signal generator; a method of setting the loop gain of said servo-loop while said servo loop is open, comprising:

rotating said disc in said disc player;

moving said objective lens repeatedly in an up-down pattern through the focusing point a predetermined number of time stop cause said error signal generator to generate an error signal having an S-shape in the vicinity of said focusing point;

sampling the values of said S-shaped error signal during each up-down movement of the objective lens; and setting the loop gain based exclusively upon a maximum value of a plurality of said sampled values of said S-shaped error signal, wherein the step of rotating said disc generates a forward driving pulse of a predetermined width, and applying said forward driving pulse to a spindle motor which rotates said disc in a direction and speed determined by said forward driving pulse, said speed being slower than a normal playing speed.

* * * * *